United States Patent
Holland

(10) Patent No.: US 12,129,176 B2
(45) Date of Patent: Oct. 29, 2024

(54) METHODS AND SYSTEMS FOR CONVERTING METAL OXIDES TO METAL USING METAL CARBIDE AS AN INTERMEDIATE

(71) Applicant: Consolidated Nuclear Security, LLC, Oak Ridge, TN (US)

(72) Inventor: Justin Matthew Holland, Clinton, TN (US)

(73) Assignee: Consolidated Nuclear Security, LLC, Oak Ride (TN)

( * ) Notice: Subject to any disclaimer, the term of this patent is extended or adjusted under 35 U.S.C. 154(b) by 574 days.

(21) Appl. No.: 17/344,406

(22) Filed: Jun. 10, 2021

(65) Prior Publication Data
US 2022/0411272 A1    Dec. 29, 2022

(51) Int. Cl.
*C01B 32/914* (2017.01)
*C25C 3/34* (2006.01)
*C25C 5/04* (2006.01)
*C25C 7/02* (2006.01)
*C25C 7/06* (2006.01)

(52) U.S. Cl.
CPC .............. *C01B 32/914* (2017.08); *C25C 3/34* (2013.01); *C25C 5/04* (2013.01); *C25C 7/025* (2013.01); *C25C 7/06* (2013.01)

(58) Field of Classification Search
CPC ....................................................... C25C 3/34
See application file for complete search history.

(56) References Cited

U.S. PATENT DOCUMENTS

| | | | |
|---|---|---|---|
| 2,448,479 A | 8/1948 | Wilhelm et al. | |
| 2,781,304 A * | 2/1957 | Wilhelm | C25D 3/66 205/47 |
| 2,994,650 A | 8/1961 | Slatin | |
| 3,125,497 A * | 3/1964 | Hansen | C01B 32/928 423/19 |
| 3,250,588 A | 5/1966 | Kasberg | |
| 4,534,792 A | 8/1985 | Elliott | |
| 5,531,868 A | 7/1996 | Miller et al. | |
| 6,540,902 B1 | 4/2003 | Redey et al. | |
| 7,267,754 B1 | 9/2007 | Willit | |
| 8,097,142 B2 | 1/2012 | Willit et al. | |
| 8,177,952 B2 | 5/2012 | Kang et al. | |
| 2009/0032403 A1 | 2/2009 | Malhotra | |

FOREIGN PATENT DOCUMENTS

KR    101721530 B1 *    3/2017

OTHER PUBLICATIONS

Machine translation of KR101721530B1 of Lee et al. (Year: 2017).*

(Continued)

*Primary Examiner* — Brian W Cohen
(74) *Attorney, Agent, or Firm* — Clements Bernard Walker; Christopher L. Bernard

(57) ABSTRACT

Systems and methods for converting metal oxide to metal using metal carbide as an intermediate, include: reacting the metal oxide with carbon to produce the metal carbide, wherein the metal carbide is in a form of powder or pellets; and subjecting the metal carbide produced from the metal oxide and the carbon to electrolysis in an electrorefiner to produce and purify the metal.

16 Claims, 2 Drawing Sheets

(56) References Cited

OTHER PUBLICATIONS

Katz J.J. et al., Chemistry of Uranium, Collected Papers, Chemistry Division, US Atomic Energy Commission, 1958, 53 pages.
Hur et al., Development of Electrochemical Reduction Technology for Spent Oxide Fuels, WM'03 Conference, Korea Atomic Energy Research Institute, Feb. 23-27, 2003, Tucson, AZ, 7 pages.
Lewis et al., Electrical and Thermal Transport Properties of Uranium and Plutonium Carbides A Review of the Literature, Los Alamos Scientific Laboratory of the University of California, Reporting Date: Sep. 1975 Issued: Mar. 1976, 37 pages.
Jeong et al., Electrochemical behavior of a platinum anode for reduction of uranium oxide in a LiCl molten salt, Nuclear Fuel Development Group, Korea Atomic Energy Research Institute (2009) Electrochimica Acta 54, pp. 6335-6340.
Shimada et al., Electrochemical reduction of uranium oxide in molten fluoride mixture, Journal of Alloys and Compounds, 204 (1994) 1-4.
Piper R.D. et al., Electrolytic Production of Uranium Metal from Uranium Oxides, I & EX Process Design and Development 1.3, (1962) pp. 208-212.
Strausberg, S., Preparation of UC by Carbothermic-Reduction of U308, Atomics International, A Division of North American Aviation, Inc., issued Jun. 30, 1965.
Hansen W.N., Reprocessing of Uranium Carbide, Atomics International, A Division of North American Aviation, Inc., Issued Mar. 15, 1963, 25 pages.
Dunwoody J.T. et al., Synthesis of Uranium Nitride and Uranium Carbide Powder by Carbothermic Reduction, 1 Los Alamos National Laboratory, Los Alamos, New Mexico, USA, 2007, 5 pages.
Choi et al., Reoxidation of uranium metal immersed in a Li2O-LiCl molten salt after electrolytic reduction of uranium oxide, Journal of Nuclear Materials 485 (2017) pp. 90-97.

* cited by examiner

METHODS AND SYSTEMS FOR CONVERTING METAL OXIDES TO METAL USING METAL CARBIDE AS AN INTERMEDIATE

STATEMENT REGARDING FEDERALLY SPONSORED RESEARCH AND/OR DEVELOPMENT

The U.S. Government has certain rights to the present disclosure pursuant to Contract No. DE-NA0001942 between the U.S. Department of Energy and Consolidated Nuclear Security, LLC.

FIELD OF THE DISCLOSURE

The present disclosure relates generally to methods and systems for converting metal oxides to metal and, more particularly, to methods and systems for converting metal oxides to metal using metal carbide as an intermediate.

BACKGROUND OF THE DISCLOSURE

Historically, conversion of metal oxides to metals has been a challenge especially regarding the production of metals of the group of rare earth metals (e.g., cerium, erbium, etc.) and actinide metals, such as thorium, and uranium. Such metals, especially in pure form, are advantageous to obtain as they may have application in many industries such as electronics, structural alloys, chemical catalysts, nuclear fuels and so forth.

Prior attempts to obtain pure metals include electrolytic treatment of their ores, however, this has shown to be inefficient and cumbersome, as described in U.S. Pat. No. 2,994,650.

Since the 1940s methods of converting metal oxides, such as uranium oxides ($UO_x$), to metallic uranium have been proposed in the literature. In the US, a practical conversion method has historically consisted of a three-step process whereby $UO_x$ is reduced to $UO_2$ using $H_2$ gas, converted to $UF_4$ salt using anhydrous HF gas and then reduced to $U^0$ using calcium metal. While this method may be characterized by high efficiencies and yields of uranium metal, scale-up can be challenging due to the complexities involved with the gas-solid reactions and the considerable safety constraints imposed by the use of HF and $H_2$ gases.

In an effort to avoid the use of hazardous gases in the preparation of metallic uranium from uranium oxides several alternative approaches have been proposed. For instance, as disclosed U.S. Pat. No. 4,534,792, direct conversion of uranium oxide to metal has been achieved by the action of strong reductants (e.g., calcium, magnesium, aluminum) which produce an oxide slag containing a dispersion of uranium metal particulates that must be subjected to further processing to recover.

It has also been suggested that larger metal particulates can be formed by the addition of alkali or alkaline earth halides to the reaction mixture which act as a flux. See Katz, Joseph Jacob, and Eugene Rabinowitch, eds. *The Chemistry of Uranium*. US Atomic Energy Commission, 1958.

Another direct conversion method proposed in prior literature is electrolysis of $UO_x$ dissolved in molten fluoride melts containing $UF_4$. However, this method requires high temperatures (>1200° C.) and may suffer from poor current efficiency due to the reaction of the uranium metal product with $UF_4$ in the melt. See Shimada, Taskeshi, et. al., "Electrochemical reduction of uranium oxide in molten fluoride mixture," *Journal of alloys and compounds* 204. 1-2 (1994): 1-4; and Piper, R. D., and R. F. Leifield, "Electrolytic production of uranium metal from uranium oxides," *Industrial & Engineering Chemistry Process Design and Development* 1. 3 (1962): 208-212.

Electrolysis of $UO_x$ has also been performed in lower temperature molten chloride melts as described in U.S. Pat. No. 6,540,902. This method relies on direct electrolytic reduction of solid $UO_x$ contained in a feed basket that is lowered into a melt, typically LiCl containing dissolved $Li_2O$. The oxide ions which are abstracted from $UO_x$ are transported to a platinum anode by the dissolved $Li_2O$ where they are oxidized to $O_2$ gas. Known issues with such a conversion method are anode degradation and poor current efficiency. See, e.g., Jeong, Sang Mun, et al. "Electrochemical behavior of a platinum anode for rejection of uranium oxide in a LiCl molten salt," *Electrochimica Acta* 54.26 (2009): 6335-6340.

Thus, what is still needed in the art is a novel approach for methods and systems for converting metal oxides to metal, especially to metals of the group of rare earth metals (e.g., cerium, erbium, etc.) and actinide metals, such as thorium, and uranium. Further, it is desirable to provide such methods and systems for converting the metal oxide to metal while requiring a minimal number of processing steps and avoiding many of the drawbacks associated with other oxide conversion technologies.

BRIEF SUMMARY OF THE DISCLOSURE

In various exemplary embodiments, the present disclosure provides a novel approach for methods and systems for converting metal oxides to metal, especially to metals of the group of rare earth metals (e.g., cerium, erbium, etc.) and actinide metals, such as thorium, and uranium. Further, such methods and systems can be provided for converting the metal oxide to metal while requiring a minimal number of processing steps and avoiding many of the drawbacks associated with other oxide conversion technologies.

In one exemplary embodiment, the present disclosure provides a method for converting metal oxide to metal using metal carbide as an intermediate. The method comprises reacting the metal oxide with carbon to produce the metal carbide, wherein the metal carbide is in a form of powder or pellets; and subjecting the metal carbide produced from the metal oxide and the carbon to electrolysis in a first electrorefiner to produce and purify the metal.

The method may comprises reacting the metal oxide with the carbon under vacuum and at an elevated temperature between about 1500° C. to and about 1800° C. to produce the metal carbide.

The metal oxide may comprise metal oxide powder or pellets and the carbon may comprise graphite powder or pellets.

The method may further comprise blending the metal oxide powder or pellets and the graphite powder or pellets to produce a blended mixture of the metal oxide and the carbon, which is heated at the elevated temperature to produce the metal carbide.

The method may further comprise ball-milling of the metal oxide powder or pellets and the graphite powder or pellets to produce a homogenized mixture, which is heated at the elevated temperature to produce the metal carbide.

The metal oxide may comprise at least one metal oxide selected from the group consisting of oxides of rare earth and actinide metals.

The metal carbide may comprise at least one metal carbide selected from the group consisting of carbides of Hf, Th, U, Ln, Ce, Pr, Nd, Pm, Sm, Eu, Gd, Tb, Dy, Ho, Er, Tm, Yb and Lu.

The metal oxide may be uranium oxide and the metal carbide may be uranium carbide.

The electrolysis may comprise providing the first electrorefiner into which the metal carbide is transferred, the first electrorefiner comprising a bath vessel holding a dry salt mixture, the dry salt mixture comprising a dry salt medium, and the dry salt mixture is configured to be heated to form a molten salt bath; heating the dry salt mixture to form the molten salt bath; disposing a cathode assembly into the molten salt bath; depositing the metal carbide into an anode feed basket and disposing the anode feed basket with the metal carbide therein into the molten salt bath; coupling a power supply to the anode feed basket and the cathode assembly, wherein the power supply produces a current flow causing oxidization of the metal at the anode feed basket, and reduction of the metal on the cathode assembly as electrorefined dendritic metal which includes salt, wherein graphite and salt accumulates in the anode feed basket.

The method may also comprise: processing the electrorefined dendritic metal which includes salt in a salt recovery chamber to evaporate the salt from the dendritic metal by heating to between about 700° C. and about 1100° C., and processing the anode feed basket including the accumulated graphite and salt therein in the salt recovery chamber to evaporate the salt from the anode feed basket by heating to between about 700° C. and about 900° C.

The method may further comprise after evaporating the salt from the dendritic metal, consolidating the dendritic metal by heating to between about 1100° C. and about 1500° C. to melt the dendrites and produce bulk metal.

The method may also comprise providing a salt recycling stream from the salt recovery chamber to the first electrorefiner, and a graphite recycling stream from the salt recovery chamber to an initial feed of the graphite powder or pellets to a feed preparation chamber.

The method may also comprise removal of the accumulated graphite from the anode feed basket returning the anode feed basket now clean to the first electrorefiner.

The method may also comprise further purifying the bulk metal by further electrolysis in a second electrorefiner. The further electrolysis may comprise: providing the second electrorefiner, the second electrorefiner comprising a second bath vessel holding a second dry salt mixture, the second dry salt mixture comprising a second dry salt medium, and the second dry salt mixture is configured to be heated to form a second molten salt bath; heating the second dry salt mixture to form the second molten salt bath; disposing a second cathode assembly into the second molten salt bath; depositing the bulk metal into the molten salt bath for further purification; and coupling a second power supply to the bulk metal and the cathode assembly, wherein the second power supply produces a second current flow; and wherein the bulk metal is further electrorefined.

The method may also comprise providing a second salt recycling stream from the salt recovery chamber to the second electrorefiner.

The method may further comprise providing the further refined bulk metal and salt to the salt recovery chamber for removal of the salt from the further refined bulk metal.

The dry salt medium may comprise a dry salt medium eutectic, and the dry salt mixture may be heated to melt the eutectic and form the molten salt bath, which is a molten salt eutectic bath. The dry salt medium may also comprise one or more of LiCl, NaCl, KCl, RbCl, CsCl, $MgCl_2$, $CaCl_2$, $SrCl_2$ and $BaCl_2$.

In another exemplary embodiment, the present disclosure provides a system for converting metal oxide to metal using metal carbide as an intermediate. The system comprises: a furnace configured to receive and react metal oxide powder or pellets with carbon powder or pellets to produce metal carbide in a form of the powder or pellets; a first electrorefiner configured to receive the metal carbide; the first electrorefiner comprising: a bath vessel holding a dry salt mixture, the dry salt mixture comprising a dry salt medium and the dry salt medium is configured to be heated to form a molten salt bath; a cathode assembly configured to be disposed into the molten salt bath; an anode feed basket configured to receive the metal carbide and be disposed into the molten salt bath; a power supply coupling the anode feed basket to the cathode assembly and configured to produce a current flow causing oxidation of the metal at the anode feed basket, and reduction of the metal on the cathode assembly as electrorefined dendritic metal which includes salt; a salt recovery chamber configured to receive the electrorefined dendritic metal and evaporate the salt therefrom; and a metal consolidation furnace configured to receive the electrorefined dendritic metal with salt evaporated therefrom and consolidate the dendritic metal to produce bulk metal.

The system may further comprise a second electrorefiner configured to receive and further purify the bulk metal.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION

Embodiments provide a novel approach for methods and systems for converting metal oxides to metal, especially to metals of the group of rare earth metals (e.g., cerium, erbium, etc.) and actinide metals, such as thorium, and uranium. Further, such methods and systems can be provided for converting the metal oxide to metal while requiring a minimal number of processing steps and avoiding many of the drawbacks associated with other oxide conversion technologies.

Thus, according to embodiments, methods and systems are provided for a nearly direct path for the conversion of metal oxide to metal, such as $UO_x$ to metallic uranium, that avoids drawbacks of existing methods. A particular method proposed herein, according to embodiments, may be referred to as Metallic Uranium by Carbothermic Reduction of Oxide and Electrolysis (MUCORE). According to an embodiment, the method includes reaction of $UO_x$ with carbon at elevated temperature to produce uranium carbide (UC), and electrolysis of UC to produce dendritic uranium metal. The inventor has advantageously determined how to unite these two features into a method for metallic uranium production starting from an oxide feed and using uranium carbide as an intermediate to produce uranium metal, according to embodiments.

It is noted that while particular reference to producing purified uranium may be referred to herein in exemplary embodiments, the embodiments of the invention disclosed herein are applicable to producing other metals, especially other purified metals of the group of rare earth metals (e.g., cerium, erbium, lanthanides, etc.) and actinide metals, such as thorium, and uranium, or any other desired/suitable metal.

Figure 1:
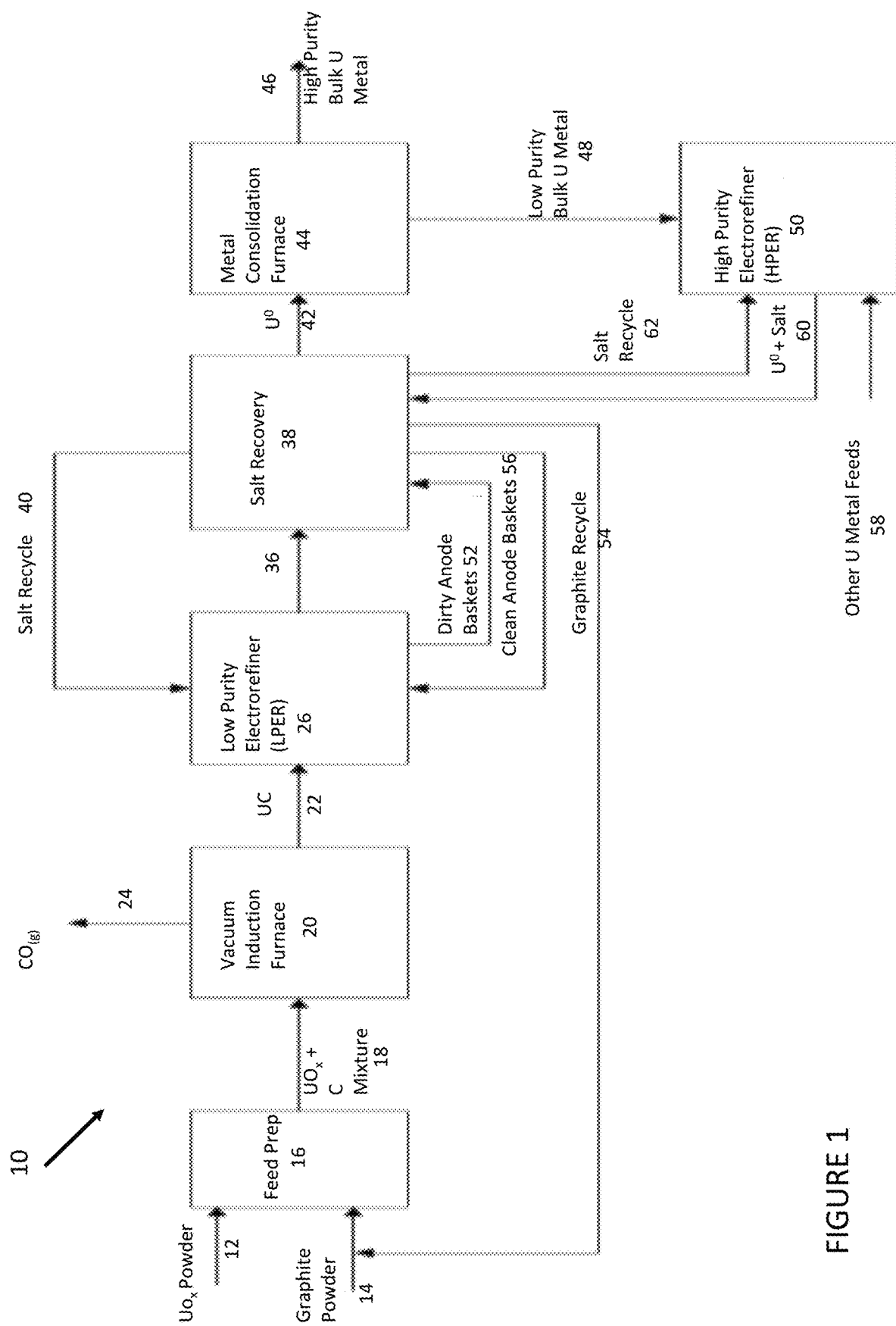
FIG. 1 is schematic diagram illustrating one exemplary embodiment of the system/method for converting metal oxides to metal, especially to a metal of the group of rare earth metals (e.g., cerium, erbium, etc.) and actinide metals, such as thorium, and uranium, of the present disclosure.

Referring now specifically to FIG. 1, in one exemplary embodiment, the present disclosure provides a method/system 10 for converting metal oxides to metal carbide, such as uranium carbide, as an intermediate. Further, such methods and systems can be provided for converting the metal oxide to metal while requiring a minimal number of processing steps and avoiding many of the drawbacks associated with other oxide conversion technologies.

Advantageously, embodiments of the invention can convert the metal oxide to metal in methods and systems that can readily be adapted to desired processing scale, without requiring hazardous reactants, such as hazardous gases, and thus without the use of, e.g., HF or $H_2$. In contrast and as further described below, a molten salt bath can be employed with the use of minimal processing equipment.

Further advantages of embodiments of the invention include: i) adaptation to processes for uranium metal; ii) may use the same molten salt bath, e.g., LiCl—KCl—UCl$_3$, in both the low purity electrorefiner (LPER) and high purity electrorefiner (HPER) as further described below; iii) mature oxide to carbide process; iv) avoids drawbacks of other conversion methods because no hazardous gases required/produced (it is noted that $CO_{(g)}$ may exit the vacuum induction furnace, as further explained below (P<300 mtorr)), no consumables required other than graphitic carbon, process efficiency expected to be high (>90%), and avoids technical complexities involved with other electrolytic conversion methods.

Moreover, embodiments of the invention have application in a variety of industries where, e.g., metal oxide to metal conversion is needed, such as in fuels including spent fuels and so forth.

As illustrated in FIG. 1, a metal oxide stream 12 may be blended with a graphite stream 14 in a feed preparation chamber 16. Typically, the metal oxide stream 12 includes powder or pellets of the metal oxide. Similarly, the graphite stream 14 typically includes powder or pellets of the graphite. The particle size of the metal oxide and of the graphite can vary as desired and may range from about 10 um to about 100 um as a non-limiting example. Moreover, the oxide of metal and graphite/carbon can also be in substantially stoichiometric proportions. It is noted that while metal oxide powder and graphite powder may be preferred, other forms of the metal oxide and graphite/carbon are also possible.

The metal oxide stream 12 may include any desired/suitable metal oxide. It is noted that embodiments of the invention are applicable to metal oxides which cannot be reduced to metal directly by heating with carbon. In embodiments, the metal oxide is capable of reacting with carbon to form a carbide. Particularly suitable examples include, but are not limited to, oxides of Hf, Th, U, Ln, Ce, Pr, Nd, Pm, Sm, Eu, Gd, Tb, Dy, Ho, Er, Tm, Yb and Lu), which can then result in the corresponding metal carbide (stream 22). Thus, examples may include at least one oxide of the rare earth metals (e.g., Sc, Y, Ln, Ce, Pr, Nd, Pm, Sm, Eu, Gd, Tb, Dy, Ho, Er, Tm, Yb and Lu), and of other actinide metals (e.g., Ac, Th, Pa, U, Np, Pu, Am, Cm, Bk, Cf, Es, Fm, Md, No and Lr). In further accordance with embodiments, the LPER 26 and HPER 50, further described below, utilize the metal chloride salt that matches the metal being prepared. For instance, in the case of erbium, the LPER 26 and HPER 50 salts may include LiCl—KCl—ErCl$_3$. The conditions for the salt vaporization and consolidations steps may also vary depending on the metal being processes.

The metal oxide stream 12 and the graphite stream 14 enter feed preparation chamber 16, which may be any suitable blending apparatus such as a ball mill. A typical ball mill apparatus includes a rotating jar including a ceramic bead medium which can pulverize the powders being blended together to form, e.g., a homogenized mixture. The ball-milling of the metal oxide and graphite powders in the feed preparation chamber 16 can advantageously achieve a finely divided and homogenized mixture of the powders.

Stream 18 comprising the blended powder mixture of metal oxide and graphite exits the feed preparation chamber 16 as shown in FIG. 1 and enters vacuum induction furnace 20 or any other suitable heating apparatus or high temperature furnace. For example, the blended powder mixture of the metal oxide and the graphite can be poured into a crucible, such as graphite crucible, which is placed in the vacuum induction furnace 20. In the vacuum induction furnace 20, the blended powder mixture is heated under vacuum to about 1500° C. to about 1800° C. for several hours, such as about 2 to about 6 hours, to achieve conversion to metal carbide, including but not limited to, uranium carbide (UC) powder as shown in FIG. 1 at stream 22. It is noted that the above conditions are particularly suited for conversion to uranium carbide, and conditions may be adjusted accordingly for other metal carbides as appropriate. Carbon monoxide and carbon dioxide gases can also exit furnace 20 at stream 24.

It is noted that uranium carbides (UC, UC$_2$) are very high melting compounds (>2200° C.) which, importantly, possess moderate electrical conductivity on the order of about 10 mS/cm at 500° C., as described by Lewis, H. D., and J. F. Kerrisk, *Electrical and thermal transport properties of uranium and plutonium carbides*, No. LA-6096. Los Alamos Scientific Lab., NM (USA), 1976. The dicarbide is reportedly thermodynamically stable at temperatures above 2000° C., and is known to slowly decompose into UC and carbon at room temperature. Uranium carbides are pyrophoric in air, reacting to yield uranium oxides and carbon monoxide gas.

It is further noted that preparation of monocarbide from UO$_x$ has been described in, e.g., U.S. Pat. No. 2,448,479. UO$_2$ or U$_3$O$_8$ powders can be ball-milled with stoichiometric quantities of graphite powder to achieve a uniform mixture which can then heated to between about 1300° C. and 1800° C. for several hours under vacuum. The reaction can proceed as shown in Equation 1 below when UO$_2$ is used as the feed and by Equation 2 when U$_3$O$_8$ is used.

$$UO_2 + 3C \xrightarrow{>1300°\,C.} UC + 2CO_{(g)} \quad [1]$$

$$U_3O_8 + 11C \xrightarrow{>1300°\,C.} 3UC + 8CO_{(g)} \quad [2]$$

The oxygen content in the final product decreases as the processing temperature increases. It has been reported that <400 ppm oxygen can be attained by holding the reaction at 1800° C. See Strausberg, S. *Preparation of UC by Carbothermic-reduction of U308.* Atomics International, 1965.

As further shown in FIG. 1, according to embodiments, the metal carbide stream 22 then can enter a first electrorefiner (EF) such as low purity electrorefiner (LPER) 26 shown in FIG. 1 for purification of the metal. For example and with reference to FIG. 2, the metal carbide, such as UC powder 22, can be transferred into one or more anode feed baskets 28 fabricated from, e.g., graphite 32 and placed into a salt melt or molten salt bath 30 of the LPER 26. The salt melt or molten salt bath 30 can comprise any suitable salt. For example, suitable constituents include lithium, potassium, chloride eutectic salt that contains dissolved metal chloride, such as $UCl_3$. It is noted that chloride salts may be used for electrolysis applications as they are readily available in bulk quantities, and have reasonably low melting points and vapor pressure. According to embodiments, any desired combination of alkali- and/or alkaline earth chlorides may be used for the LPER 26 and EWER 30 salts. The carrier species, in this example $UCl_3$, should be tailored to the metal being prepared.

According to embodiments, the LPER 26 is configured to receive the metal carbide 22 and comprises a bath vessel holding a dry salt mixture. The dry salt mixture comprises a dry salt medium and is configured to be heated to form the molten salt bath 30. The dry salt medium can comprise a dry salt medium eutectic, and be heated to melt the eutectic and form a molten salt eutectic bath. The dry salt medium can also comprise one or more of LiCl, NaCl, KCl, RbCl, CsCl, $MgCl_2$, $CaCl_2$, $SrCl_2$, $BaCl_2$. It is noted that a KCl—LiCl eutectic system is a particularly useful solvent system. Additions of any suitable metal chloride, including but not limited to $UCl_3$, may also be employed in the bath, and in amounts such as between about 2 wt. % to about 15 wt. % $UCl_3$ among others.

The LPER 26 can further include a cathode or cathode assembly 34 configured to be disposed in the molten salt bath 30, and the anode feed basket(s) 28 configured to receive the metal carbide 22 and be disposed in the molten salt bath 30. The cathode or cathode assembly 34 can be any suitable electrical conductor and typically is inert to the molten salt bath 30 and provides a good surface for adherence of the dendritic metal, further described below. As a non-limiting example, a molybdenum rod or other shaped electrical conductor may be employed.

Electrolysis of the metal carbide powder 22, such as UC powder, can lead to carbon accumulation in the anode feed basket 28 and dendritic uranium metal deposition on the cathode 34 placed therein and as a result of the metal dissolving in the salt bath. It is noted that during operation an electrical potential, typically less than about 2 VDC, can be applied between the anode feed basket 28 and the cathode or cathode assembly 34 by a suitable external power source. The power supply 35 coupling the anode feed basket 28 to the cathode or cathode assembly 34 is configured to produce a current flow causing oxidation of the metal at the anode feed basket 28, and reduction of the metal on the cathode or cathode assembly 34 as electrorefined dendritic metal which includes some salt. It is noted that an inert gas, such as argon, may be employed to help maintain a more pristine atmosphere over the salt which can increase efficiency. Additionally, application time may vary such as between, e.g., several minutes to several hours, and it will be appreciated that processing time depends on factors such as scale of the equipment, cell geometry and so forth. It is further noted that some carbon contamination of the product metal (e.g., metallic uranium) could occur during this processing step.

The electrorefined dendritic metal and salt which includes the dendritic metal product, such as metallic uranium, can be removed from the LPEF 26 and will typically contain residual drag-out salt that can be removed prior to consolidation. Thus, as shown in FIG. 1, stream 36 including the electrorefined dendritic metal and salt can be processed through a salt recovery step in which the electrorefined dendritic metal and salt enters salt recovery chamber 38. Salt recovery chamber 38 can utilize a vacuum retort heated by a resistance furnace to i) evaporate salt from the metal dendrites by heating to about 700° C. to about 1100° C., typically to about 800° C. to about 900° C., under vacuum and ii) evaporate the salt from the anode basket by heating to about 700° C. to about 900° C. which allows recovery of residual graphite and other impurities. In both cases, the evaporated salt can condense at a cool zone in the retort, collected after processing and returned to the LPER 26 via salt recycle stream 40 shown in FIG. 1.

In stream 52 exiting the LPER 26, the one or more anode feed baskets 28 typically now contain graphite retained therein (e.g., "dirty" anode baskets) also enter the salt recovery chamber 38. As further shown in FIG. 1, graphite recycle stream 54 exits the salt recovery chamber and can be recycled back to graphite powder feed stream 14. Thus, graphite recycle stream 54 can be used as a feed stream to graphite stream 14 and stream 52 including the dirty anode basket(s) can contribute to the graphite recycle stream 54. Stream 36 including the electrorefined metal and salt which includes the dendritic metal product can then enter salt recovery chamber 38, as also shown in FIG. 1. Upon removal and recycle of the graphite, stream 56 can return the anode basket(s) as clean anode basket(s) back to the LPER 26.

The now essentially salt-free dendritic metal, such as $U^0$, can exit the salt recovery chamber 38 and be sent to a metal consolidation furnace 44 or other suitable furnace in an inert atmosphere or vacuum induction melter via stream 42 which can then heat the metal dendrites to about 1100° C. to about 1500° C., typically about 1300° C. for, e.g., uranium, to melt them and form a bulk mass of metal, such as uranium metal. It will be appreciated that other temperatures may also be employed and tailored thereto depending on the metal, such as e.g., hafnium, thorium. The bulk mass of metal, such as uranium metal, can then be sampled to determine if the material meets desired purity requirements, such as greater than about 99.99% purity, as high purity bulk metal 46 and as such no further processing is required. If the desired purity requirements are not attained, the bulk metal, which can be designated as low purity bulk metal can be sent via stream 48 to a second electrorefiner, such as high purity electrorefiner (HPER) 50 for further purification of the metal. In this regard it is noted that as the LPER 26 employs the metal carbide 22 as a feed, carbon residue is typically produced in the anode basket(s) 28 and some of that carbon may get dispersed within the LPER 26 and potentially contaminate the product to an extent thus resulting in a higher carbon product coming out of the LPER 26. Thus, the material may be further purified by processing through the HPER 50 to reduce the carbon contamination.

Figure 2:
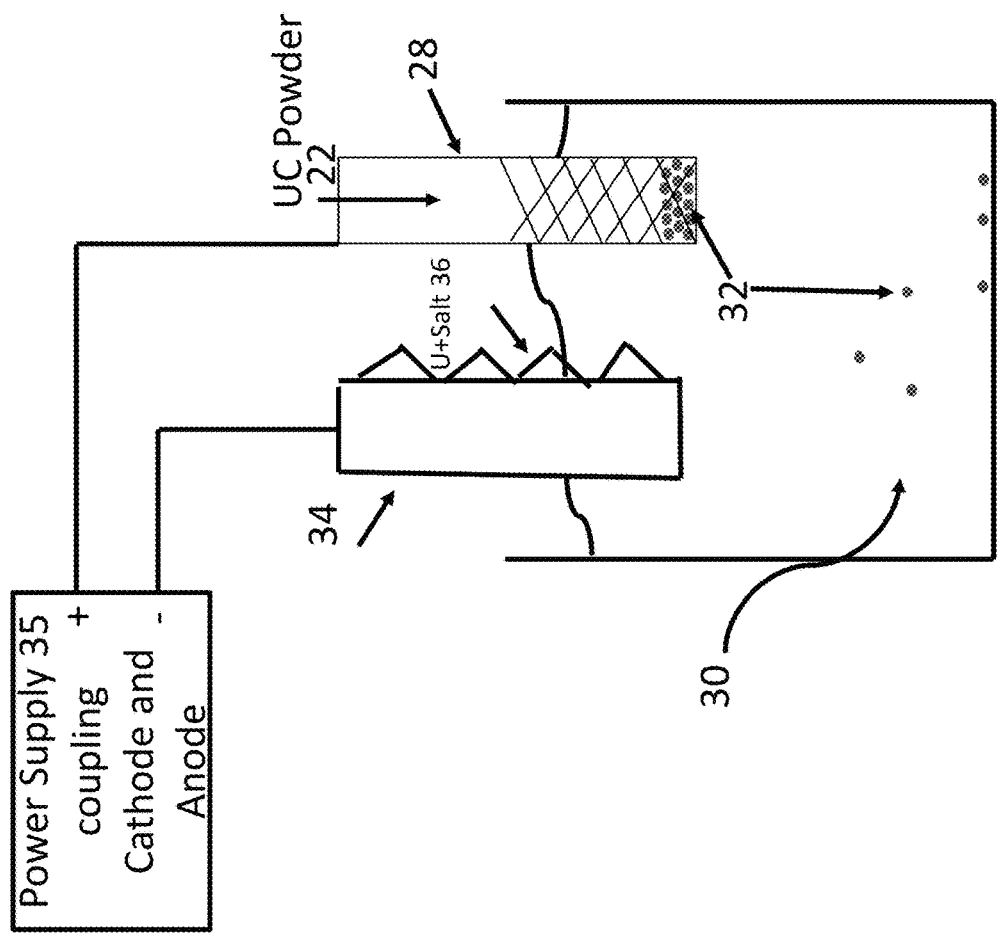
FIG. 2 is a schematic diagram illustrating an exemplary embodiment of a portion of an electrorefiner including salt bath with anode feed basket therein, of the present disclosure.

HPER 50 may be described similarly as in the case of LPER 26 above and include such similar features as those described and shown in FIGS. 1 and 2 with respect to the LPER 26. Thus, with reference to FIGS. 1 and 2 and as a non-limiting example, bulk metal 48 can enter the salt melt or molten salt bath 30 of HPER 50. The salt melt or molten salt bath 30 can comprise any suitable salt. For example, suitable constituents include lithium, potassium, chloride eutectic salt that contains dissolved metal chloride, such as $UCl_3$.

According to embodiments, as in the case of the LPER 26, the HPER 50 can comprise a bath vessel holding a dry salt mixture. The dry salt mixture comprises a dry salt medium and is configured to be heated to form the molten salt bath 30. The dry salt medium can comprise a dry salt medium eutectic, and be heated to melt the eutectic and form a molten salt eutectic bath. The dry salt medium can also comprise one or more of LiCl, NaCl, KCl, RbCl, CsCl, $MgCl_2$, $CaCl_2$, $SrCl_2$, $BaCl_2$, $ZnCl_2$, $SnCl_4$, $AlCl_3$, $GaCl_3$ and $InCl_3$. It is noted that a KCl—LiCl eutectic system is a particularly useful solvent system. Additions of any suitable metal chloride, including but not limited to $UCl_3$, may also be employed in the bath, and in amounts such as between about 2 wt. % to about 15 wt. % $UCl_3$ among others. It is noted that the salt melt of the HPER 50 is expected to maintain a higher level of purity than the LPER 26 since the feed to the HPER 50 will be in the form of bulk metal in contrast to the metal carbide feed 22, such as UC powder feed 22 to the LPER 26.

The HPER 50 can also include a cathode or cathode assembly 34 configured to be disposed in the molten salt bath 30, and the anode feed basket(s) 28 configured to receive the bulk metal and be disposed in the molten salt bath 30. The cathode or cathode assembly 34 can be any suitable electrical conductor and typically is inert to the molten salt bath 30. As a non-limiting example, a molybdenum rod or other shaped electrical conductor may be employed.

Electrolysis can lead to a reduction in carbon contamination content of the bulk metal. It is noted that during operation an electrical potential, typically less than about 1 VDC, can be applied between the anode feed basket 28 and the cathode or cathode assembly 34 by a suitable external power source. The power supply 35 coupling the anode feed basket 28 to the cathode or cathode assembly 34 is configured to produce a current flow causing the metal to be transported from the anode to the cathode. It is noted that an inert gas, such as argon, may be employed to help maintain a more pristine atmosphere over the salt which can increase efficiency. Additionally, application time may vary such as between, e.g., several minutes to several hours, and it will be appreciated that processing time depends on factors such as scale of the equipment, cell geometry and so forth.

The electrorefined (bulk) metal which includes the metal product, such as uranium product, can be removed from the HPEF 50 and will typically contain residual drag-out salt that can be removed with further processing. Thus, as shown in FIG. 1, stream 60 including the electrorefined (bulk) metal and salt, such as $U^0$ and salt, can enter salt recovery chamber 38 for processing through a salt recovery step. Salt recovery chamber 38 can utilize a vacuum retort heated by a resistance furnace to i) evaporate salt from the metal dendrites by heating to about 700° C. to about 1100° C., typically to about 800° C. to about 900° C., under vacuum and ii) evaporate the salt from the anode basket by heating to about 700° C. to about 900° C. which allows recovery of residual graphite and other impurities. In both cases, the evaporated salt can condense at a cool zone in the retort, collected after processing and returned to the HPER 50 via salt recycle stream 62 shown in FIG. 1.

The now essentially salt-free metal, such as $U^0$, can exit the salt recovery chamber 38 and be sent to a metal consolidation furnace or other suitable furnace in an inert atmosphere or vacuum induction melter via stream 42 which can then heat the metal to about 1100° C. to about 1500° C., typically about 1300° C., to further form the bulk mass of metal, such as uranium metal. The bulk mass of metal, such as uranium metal, can then be sampled to determine if the material meets desired purity requirements, such as greater than 99.99% purity, as high purity bulk metal 46 and as such no further processing is required. If the desired purity requirements are not attained, the bulk metal could potentially be sent again via stream 48 to high purity electrorefiner (HPER) 50 for further processing.

Additionally, the HPER 50 can also advantageously be used to electrorefine other metal feeds, including but not limited to other uranium metal feeds apart from those coming from the LPER 26, as well as spent fuels for purification, as shown at stream 58 in FIG. 1, if so desired. In this regard, according to embodiments other metal fees may be used when the salts baths are changed to accommodate a different target metal. Thus, according to embodiments, if the LPER 26 and HPER 50 contain LiCl—KCl—$UCl_3$, for instance, a different target metal other than uranium could not be processed in that system. If, e.g., erbium was desired to be processed, the salts in the LPER 26 and HPER 50 could be changed to LiCl—KCl—$ErCl_3$. In addition, processing parameters such as temperature, soak time and so forth may need to be adjusted to tailor to and accommodate the different metal processing. Moreover, according to embodiments, it is noted that regardless of the target meta, purification in the LPER 26 and HPER 50 can occur when the impurities in the fees are more noble than the target metal.

Thus, according to embodiments, the present disclosure provides a novel approach for methods and systems for converting metal oxides to metal, especially to metals of the group of rare earth metals (e.g., cerium, erbium, etc.) and actinide metals, such as thorium, and uranium, or other desired/suitable metal. Further, such methods and systems can be provided for converting the metal oxide to metal while requiring a minimal number of processing steps and avoiding many of the drawbacks associated with other oxide conversion technologies.

Thus, according to embodiments, methods and systems are provided for a nearly direct path for the conversion of metal oxide to metal, such as $UO_x$ to metallic uranium, that avoids drawbacks of existing methods. A particular method proposed herein, according to embodiments, may be referred to as Metallic Uranium by Carbothermic Reduction of Oxide and Electrolysis (MUCORE). According to embodiments, the method includes reaction of $UO_x$ with carbon at elevated temperature to produce uranium carbide (UC), and electrolysis of UC to produce dendritic uranium metal. The inventor has advantageously determined how to unite these two features into a method for metallic uranium production starting from an oxide feed and using uranium carbide as an intermediate to produce uranium metal, according to embodiments.

It is noted that while particular reference to producing purified uranium may be referred to herein in exemplary embodiments, the embodiments of the invention disclosed herein are application to producing/purifying any other desired metals. Thus, in one exemplary embodiment, the present disclosure provides a method/system 10 for converting metal oxides to metal, especially to a metal of the group of rare earth metals (e.g., cerium, erbium, etc.) and actinide metals, such as thorium, and uranium, or other desired metal. Further, such methods and systems can be provided for converting the metal oxide to metal while requiring a minimal number of processing steps and avoiding many of the drawbacks associated with other oxide conversion technologies.

Advantageously, embodiments of the invention can convert the metal oxide to metal in methods and systems that can readily be adapted to desired processing scale, without requiring hazardous reactants, such as hazardous gases. In contrast, molten salts can be employed with the use of minimal processing equipment. Advantageously, a completely pyro-based process may be employed and integration of the systems/processes herein may be seamlessly integrated with metal, such as uranium, electrorefining.

Still further advantages of the afore-referenced minimal processing equipment required include use of carbide synthesis such as a ball mill and vacuum furnace; and electrolysis such as an electrorefining cell, and post processing equipment for product. Advantageously, only carbon is required as a reactant, according to embodiments.

Additional advantages include current efficiency of metal carbide, such as UC, electrolysis is expected to be very high in, e.g., molten LiCl—KCl—UCl$_3$, and there is not a concern over platinum metal loss as, e.g., platinum anodes are not employed, according to embodiments.

Moreover, embodiments of the invention have application in a variety of industries where, e.g., metal oxide to metal conversion is needed, such as in fuels including spent fuels and so forth.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes. Additional all disclosed features and elements can be used in any combinations, according to embodiments.

What is claimed is:

1. A method for converting metal oxide to metal using metal carbide as an intermediate, the method comprising:
    reacting the metal oxide with carbon to produce the metal carbide, wherein the metal carbide is in a form of powder or pellets; and
    subjecting the metal carbide produced from the metal oxide and the carbon to electrolysis in a first electrorefiner to produce and purify the metal, wherein the electrolysis comprises:
    providing the first electrorefiner into which the metal carbide is transferred, the first electrorefiner comprising a bath vessel holding a dry salt mixture, the dry salt mixture comprising a dry salt medium, and the dry salt mixture is configured to be heated to form a molten salt bath;
    heating the dry salt mixture to form the molten salt bath;
    disposing a cathode assembly into the molten salt bath;
    depositing the metal carbide into an anode feed basket and disposing the anode feed basket with the metal carbide therein into the molten salt bath; and
    coupling a power supply to the anode feed basket and the cathode assembly, wherein the power supply produces a current flow causing oxidization of the metal at the anode feed basket, and reduction of the metal on the cathode assembly as electrorefined dendritic metal which includes salt, wherein graphite and salt accumulates in the anode feed basket;
    the method further comprising processing the electrorefined dendritic metal which includes salt in a salt recovery chamber to evaporate the salt from the dendritic metal by heating to between about 700° C. and about 1100° C., and
    processing the anode feed basket including the accumulated graphite and salt therein in the salt recovery chamber to evaporate the salt from the anode feed basket by heating to between about 700° C. and about 900° C.

2. The method of claim 1, comprising reacting the metal oxide with the carbon under vacuum and at an elevated temperature between about 1500° C. to and about 1800° C. to produce the metal carbide.

3. The method of claim 2, wherein the metal oxide comprises metal oxide powder or pellets and the carbon comprises graphite powder or pellets, and blending the metal oxide powder or pellets and the graphite powder or pellets to produce a blended mixture of the metal oxide and the carbon, which is heated at the elevated temperature to produce the metal carbide.

4. The method of claim 3, comprising ball-milling of the metal oxide powder or pellets and the graphite powder or pellets to produce a homogenized mixture, which is heated at the elevated temperature to produce the metal carbide.

5. The method of claim 1, wherein the metal oxide comprises at least one metal oxide selected from the group consisting of oxides of rare earth and actinide metals.

6. The method of claim 1, wherein the metal carbide comprises at least one metal carbide selected from the group consisting of carbides of Hf, Th, U, Ln, Ce, Pr, Nd, Pm, Sm, Eu, Gd, Tb, Dy, Ho, Er, Tm, Yb and Lu.

7. The method of claim 3, wherein the metal oxide is uranium oxide and the metal carbide is uranium carbide.

8. The method of claim 1, comprising:
    after evaporating the salt from the dendritic metal, consolidating the dendritic metal by heating to between about 1100° C. and about 1500° C. to melt the dendrites and produce bulk metal.

9. The method of claim 1, comprising providing a salt recycling stream from the salt recovery chamber to the first electrorefiner, and a graphite recycling stream from the salt recovery chamber to an initial feed of graphite powder or pellets to a feed preparation chamber.

10. The method of claim 9, comprising removal of the accumulated graphite from the anode feed basket returning the anode feed basket now clean to the first electrorefiner.

11. The method of claim 8, comprising further purifying the bulk metal by further electrolysis in a second electrorefiner.

12. The method of claim 11, wherein the further electrolysis comprises:
    providing the second electrorefiner, the second electrorefiner comprising a second bath vessel holding a second dry salt mixture, the second dry salt mixture comprising a second dry salt medium, and the second dry salt mixture is configured to be heated to form a second molten salt bath;
    heating the second dry salt mixture to form the second molten salt bath;
    disposing a second cathode assembly into the second molten salt bath;
    depositing the bulk metal into the molten salt bath for further purification; and
    coupling a second power supply to the bulk metal and the cathode assembly, wherein the second power supply produces a second current flow; and wherein the bulk metal is further electrorefined.

13. The method of claim 12, comprising providing a second salt recycling stream from the salt recovery chamber to the second electrorefiner.

14. The method of claim 12, comprising providing the further refined bulk metal and salt to the salt recovery chamber for removal of the salt from the further refined bulk metal.

15. The method of claim 1, wherein the dry salt medium comprises a dry salt medium eutectic, and the dry salt mixture is heated to melt the eutectic and form the molten salt bath, which is a molten salt eutectic bath.

16. The method of claim 15, wherein the dry salt medium comprises one or more of LiCl, NaCl, KCl, RbCl, CsCl, $MgCl_2$, $CaCl_2$, $SrCl_2$ and $BaCl_2$.

* * * * *